UNITED STATES PATENT OFFICE.

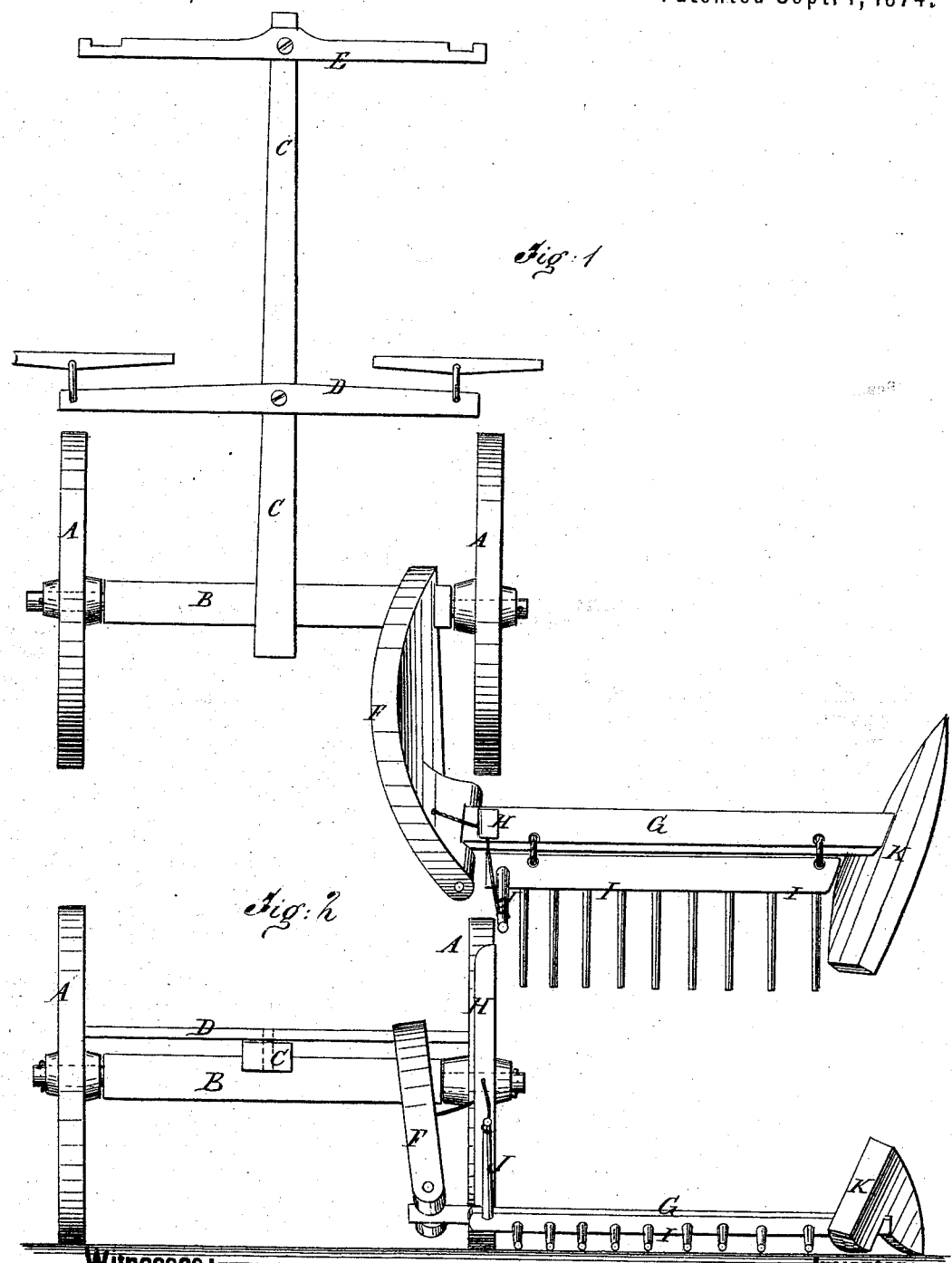

CHARLES P. WING, OF FAYETTEVILLE, NEW YORK.

IMPROVEMENT IN HARVESTERS.

Specification forming part of Letters Patent No. 154,739, dated September 1, 1874; application filed October 25, 1873.

*To all whom it may concern:*

Be it known that I, CHARLES P. WING, of Fayetteville, in the county of Onondaga and State of New York, have invented a new and useful Improvement in Harvesters, of which the following is a specification:

Figure 1 is a top view of a portion of a harvester illustrating my invention. Fig. 2 is a rear view of the same.

Similar letters of reference indicate corresponding parts.

The invention will first be fully described, and then pointed out in the claim.

A are the wheels, which are made large, so that their axle B and the frame-work and gearing of the machine may readily pass over the gavels without disturbing the grain. The axle B is made longer than harvester-axles are usually made, so that the wheels A may readily pass upon the opposite sides of the gavels without disturbing the grain. C is the tongue, which is secured to the axle B in the ordinary manner, and with which are connected the double-tree D and neck-yoke E. The neck-yoke E is made longer than neck-yokes are usually made, and the double-tree D is made longer than double-trees are usually made, and longer than the neck-yoke E. By this construction, the draft-animals can walk one upon each side of the gavels without disturbing the grain. F represents the part of the frame that supports the cutter-bar G, the reel-post H, and their attachments. The rear part F projects to the rearward, and inclines toward the uncut grain, as shown in Figs. 1 and 2, so as to be out of the way of the gavels, over which the machine may be passing. I is the dropper, which is connected with the cutter-bar G, and is operated by a lever, J, or other suitable device, in the ordinary manner. K is the grain-divider, which is attached to the outer end of the finger-bar G, with its forward end inclining outward, and its rear end inclining inward and projecting to the rearward, so that the gavels may drop from the dropper I at such a distance from the standing grain as to be out of the way of the inner or off horse and the inner wheel as the machine comes around the next time, the outer or near horse and the outer wheel passing upon the outer side of said gavels.

Having thus described my invention, I claim as new and desire to secure by Letters Patent—

The combination, in a harvester, of a side cutting and dropping mechanism, having the inclined divider K, with a carriage having axle, double-tree, and yoke, all nearly of the same length, as set forth, so that the gavel will be left between the horses and between the wheels when the next swath is cut.

CHARLES P. WING.

Witnesses:
 H. S. GROVE,
 H. S. PRATT.